United States Patent Office 3,606,801
Patented Sept. 21, 1971

3,606,801
ROTARY ACTUATOR
Bernard D. Williams, Trench, near Wellington, England, assignor to Serck Industries Limited, Birmingham, England
Filed Oct. 23, 1969, Ser. No. 868,819
Claims priority, application Great Britain, Nov. 18, 1968, 54,545/68
Int. Cl. F16h 1/18
U.S. Cl. 74—424.8      5 Claims

ABSTRACT OF THE DISCLOSURE

A rotary actuator for providing a slow-motion drive to the spindle of a fluid-controlling valve, from an axially aligned input shaft. The input shaft is threaded and carries a nut having two projections which pass through lengthwise slots in a surrounding sleeve and also engage helical slots in a stationary casing. The sleeve is secured to the valve spindle. Axial movement of the nut also causes the nut to be rotated slowly by the action of the helical slots upon the projections. The sleeve is rotated by the projecions and drives the valve spindle. The axial extent of the slots in the sleeve is greater than the extent of the helical slots. No axial load is therefore transmitted to the valve spindle.

---

This invention relates to a rotary actuator for converting torque and speed at an input shaft to a different torque and speed at an aligned output shaft with a limited freedom to rotate.

It is an object of the invention to provide a torque and speed converter in a convenient form.

According to the invention a rotary actuator comprises an input shaft having a threaded portion and a nut engaged thereon, a plurality of projections extending radially from the nut, a tube coaxial with said shaft and surrounding said shaft and nut, each said projection passing slidably through a slot extending lengthwise of said tube, an output shaft attached to said tube and having its axis aligned with the axis of the input shaft and a substantially cylindrical casing surrounding said tube, said casing having in its walls a plurality of helical slots, each helical slot slidably engaging the end of one of the said projections.

Figure 1:
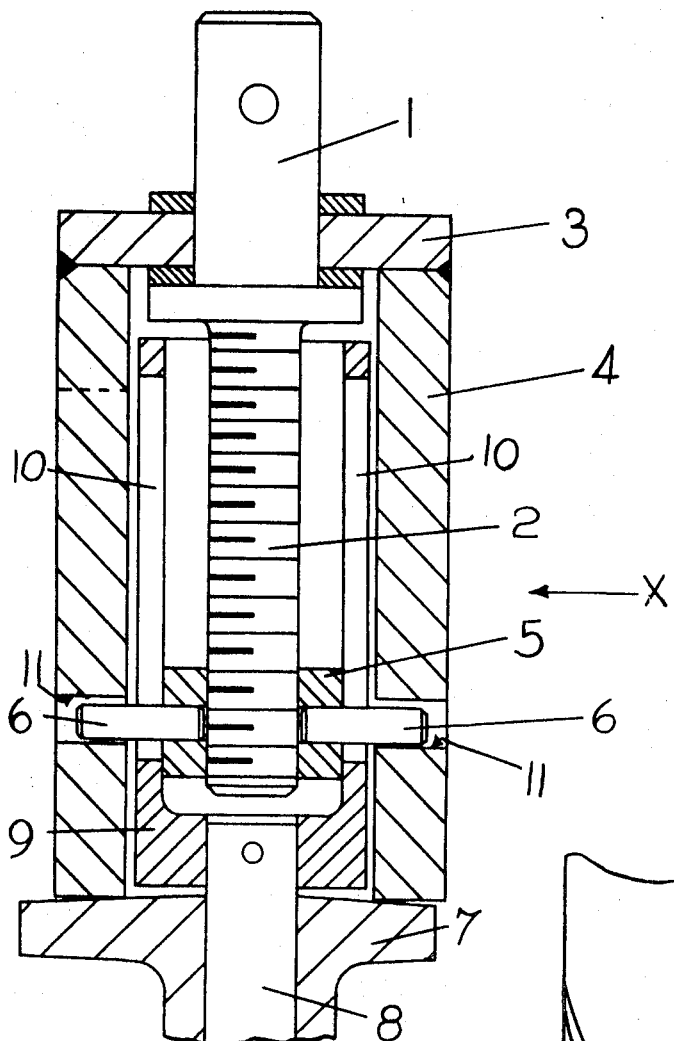
Figure 2:
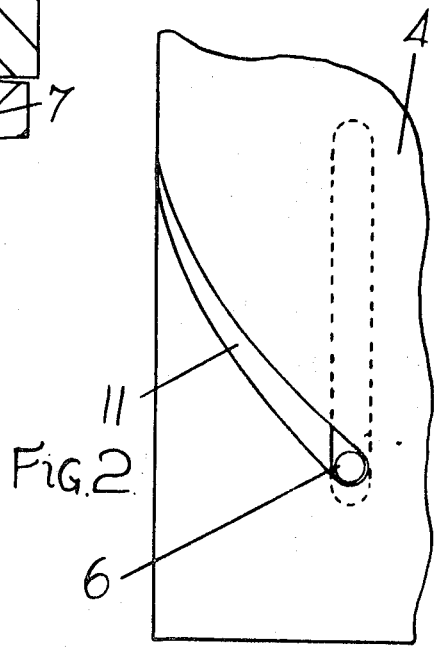

An embodiment of the invention will now be described by way of example and with reference to the following drawings in which:

FIG. 1 shows a section through a rotary actuator, and
FIG. 2 shows a view on arrow X in FIG. 1.

The actuator shown in FIG. 1 comprises a first shaft 1 having a threaded portion 2 and rotatably mounted in one end 3 of a substantially cylindrical casing 4. Engaged on the threaded portion 2 is a nut 5 having a pair of pins 6 extending radially on opposite sides thereof. Rotatably mounted in a flanged boss 7 at the other end of the casing 4 is a second shaft 8 axially aligned with the first shaft 1. Fixedly mounted on the shaft 8 and axially extending therefrom is a tube 9 which substantially encloses the nut 5 and threaded portion 2 of the shaft 1. The tube 9 has longitudinally extending slots 10 through which the pins 6 slidably pass. The casing 4 has a pair of diametrically opposed helical slots 11 (FIG. 2) extending lengthwise of the casing 4 by an amount less than the corresponding extent of the slots 10 and extending circumferentially one quarter of the way round the casing 4. The ends of the pins 6 slidably engage the slots 11.

In use the shaft 8 and flanged boss 7 form the spindle and part of the casing respectively of a valve for controlling the flow of a fluid. The valve is held stationary and shaft 1 is rotated, thereby causing the nut 5 to travel along the thread 2. The helical slots 11 cause the pins 6 to rotate relative to the casing 4 and thereby to rotate the tube 9 and shaft 8. The velocity ratio of the shafts 1, 8 will depend on the pitch of the thread on the portion 2 and on the lead of the helical slots 11.

The mechanism described is not reversible, i.e. the input shaft cannot be driven by the output shaft, since the nut 5 cannot be moved axially on the thread shaft portion 2 unless the latter is being turned. In addition the mechanism does not exert any end thrust on the output shaft 8.

Having thus described my invention, what I claim as new and desire to secure by Letters Patent is:

1. A rotary actuator for converting a torque and speed at an input shaft to a different torque and speed at an aligned output shaft with a limited freedom to rotate and comprising an input shaft having a threaded portion and a nut engaged thereon, a plurality of projections extending radially from the nut, a tube coaxial with said shaft and surrounding said shaft and nut, each said projection passing slidably through a slot extending lengthwise of said tube, an output shaft attached to said tube and having its axis aligned with the axis of the input shaft and a subsantially cylindrical casing surrounding said tube, said casing having in its walls a plurality of helical slots, each helical slot slidably engaging the end of one of the said projections.

2. An actuator as claimed in claim 1 in which the said projections comprise a pair of pins.

3. An actuator as claimed in claim 1 in which each said helical slot extends axially of the said casing by an amount which is less than the corresponding extent of the said lengthwise slot.

4. An actuator as claimed in claim 1 in which the said casing forms a bearing for the input shaft.

5. An actuator as claimed in claim 1 in which the output shaft forms a spindle of a valve for controlling a fluid and which includes means for preventing rotation of the casing.

References Cited
UNITED STATES PATENTS
2,818,743   1/1958   Zatsky _____ 74—424.8

LEONARD HALL GERIN, Primary Examiner

U.S. Cl. X.R.
74—424.8VA